(12) United States Patent
Mamigonians

(10) Patent No.: US 8,857,274 B2
(45) Date of Patent: Oct. 14, 2014

(54) FORCE SENSOR

(75) Inventor: Hrand Mami Mamigonians, London (GB)

(73) Assignee: HM Technology International Limited, Harrow, Middlesex (GB)

( * ) Notice: Subject to any disclaimer, the term of this patent is extended or adjusted under 35 U.S.C. 154(b) by 184 days.

(21) Appl. No.: 13/410,673

(22) Filed: Mar. 2, 2012

(65) Prior Publication Data

US 2012/0222498 A1 Sep. 6, 2012

(30) Foreign Application Priority Data

Mar. 4, 2011 (GB) .................................. 1103759.5

(51) Int. Cl.
*G01L 1/14* (2006.01)
*B60N 2/00* (2006.01)
*G01L 5/16* (2006.01)

(52) U.S. Cl.
CPC ................. *G01L 1/142* (2013.01); *G01L 1/146* (2013.01); *B60N 2/002* (2013.01); *G01L 5/165* (2013.01)
USPC .................................................... 73/862.626

(58) Field of Classification Search
USPC .................................................... 73/862.626
See application file for complete search history.

(56) References Cited

U.S. PATENT DOCUMENTS

| | | | |
|---|---|---|---|
| 4,839,512 A * | 6/1989 | Speck ......................... | 250/231.1 |
| 4,852,443 A * | 8/1989 | Duncan et al. .................. | 84/733 |
| 5,373,245 A | 12/1994 | Vranish | |
| 6,960,790 B2 * | 11/2005 | Miyai et al. ...................... | 257/77 |
| 7,784,366 B2 * | 8/2010 | Daverman et al. ........ | 73/862.626 |
| 8,279,194 B2 * | 10/2012 | Kent et al. ...................... | 345/174 |
| 2006/0012944 A1 | 1/2006 | Mamigonians | |
| 2006/0119369 A1 | 6/2006 | Kawahata et al. | |
| 2008/0173105 A1 | 7/2008 | Wang et al. | |
| 2009/0158856 A1 | 6/2009 | Harish et al. | |
| 2010/0024573 A1 | 2/2010 | Daverman et al. | |
| 2010/0295814 A1 | 11/2010 | Kent et al. | |
| 2012/0222496 A1 * | 9/2012 | Mamigonians ............. | 73/862.68 |
| 2012/0223723 A1 * | 9/2012 | Mamigonians ............... | 324/649 |

FOREIGN PATENT DOCUMENTS

| | | |
|---|---|---|
| EP | 1653206 A2 | 5/2006 |
| KR | 1020100044384 | 4/2010 |

OTHER PUBLICATIONS

Cui, Z. et al, Image reconstruction for field-focusing capacitance imaging, Meas. Sci. Technol, 22 (2011), 035501 (9 pp).
Chen et al, Image reconstruction for an electrical capacitance tomography system based on a least-squares support vector machine and a self-adaptive particle swarm optimization algorithm.

* cited by examiner

*Primary Examiner* — Freddie Kirkland, III
(74) *Attorney, Agent, or Firm* — Arthur Jacob

(57) ABSTRACT

A force sensor having a compressible layer, an electrically grounded layer and an electrically active layer is disclosed. The electrically active layer comprises a transmitter electrode configured to capacitively couple to a receiver electrode. The compressible layer is compressible to allow the electrically grounded layer to move closer to the electrically active layer, so as to reduce the level of capacitive coupling between the receiver electrode and the transmitter electrode in dependence upon the magnitude of an applied force.

18 Claims, 16 Drawing Sheets

FORCE SENSOR

CROSS REFERENCE TO RELATED APPLICATIONS

This application claims priority from United Kingdom Patent Application No. 11 03 759.5 filed Mar. 4, 2011, whose contents are incorporated herein by reference in their entirety.

BACKGROUND OF THE INVENTION

1. Field of the Invention

The present invention relates to a sensor for detecting the magnitude of an applied force, and in particular a sensor that measures capacitive coupling to provide an indication of the magnitude of an applied force.

2. Description of the Related Art

Sensors that provide an output signal indicative of the magnitude of an applied force are well known in the art. Resistive sensors include piezoresistive materials whose resistivity changes in dependence upon their degree of compression due to an applied force. A problem encountered with such designs is that they are usually inflexible, as any change in the geometry of the piezoresistive material making up the sensor will cause a change in the output signal, even if no force is applied.

Additionally, many capacitive sensor types have been proposed that provide an output in dependence upon the capacitance between two electrically active plates. As capacitance is proportional to the distance between plates in the convention parallel-plate capacitor, it is relatively easy to measure the distance between plates as one is brought closer to the other under compression. However, such designs are often prone to stray capacitance from other electrical networks in close proximity, and therefore conventional capacitive sensors tend to provide inaccurate and noisy output signals.

BRIEF SUMMARY OF THE INVENTION

According to one aspect of the present invention, there is provided a force sensor having a compressible layer, an electrically grounded layer and an electrically active layer, wherein: said electrically grounded layer comprises of a flexible conductive material; said electrically active layer comprises a transmitter electrode configured to capacitively couple to a receiver electrode; and said compressible layer is compressible to allow said electrically grounded layer to move closer to said electrically active layer, so as to reduce the level of capacitive coupling between said receiver electrode and said transmitter electrode in dependence upon the magnitude of an applied force.

According to another aspect of the present invention, there is provided a method of sensing a force, comprising the steps of: providing a force sensor having a compressible layer, an electrically grounded layer and an electrically active layer, in which said electrically grounded layer comprises of a flexible conductive material, and in which said electrically active layer comprises a receiver electrode configured to capacitively couple to a transmitter electrode; applying a force to said force sensor to compress said compressible layer, thus moving said electrically grounded layer closer to said electrically active layer; and detecting the degree to which the capacitance coupling between said transmitter electrode and said receiver electrode is reduced.

DETAILED DESCRIPTION OF EXAMPLE EMBODIMENTS

FIG. 1

Figure 1:
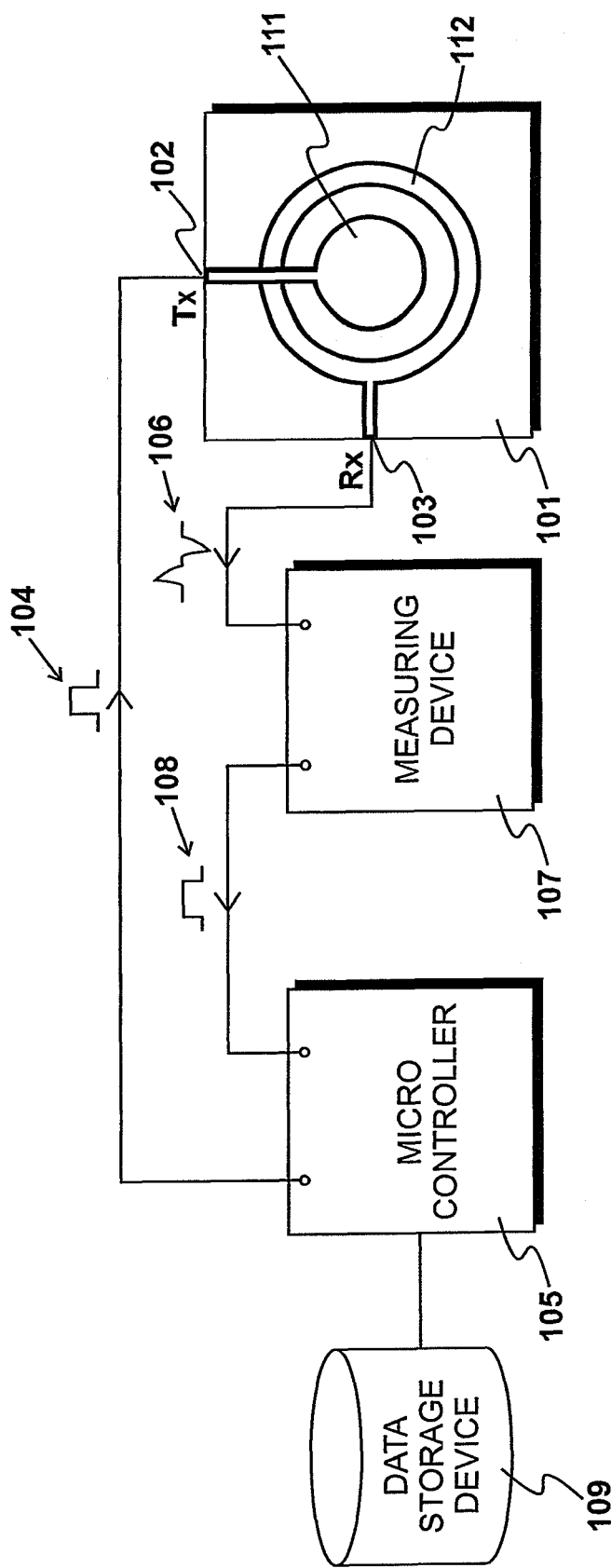
FIG. 1 shows a sensor system including a force sensor in accordance with an aspect of the present invention.

A sensor system including a force sensor arranged in accordance with an aspect of the present invention is shown in FIG. 1.

The sensor system comprises a force sensor 101 having a transmitter input 102 and a receiver output 103. Transmitter input 102 is connected to a transmitter electrode 111, whilst receiver output 103 is connected to a receiver electrode 112. Whilst transmitter electrode 111 and receiver electrode 112 are not electrically connected, they do experience a degree of capacitive coupling when a voltage is applied to transmitter electrode 111. The way in which capacitive coupling between transmitter electrode 111 and receiver electrode 112 is used to sense forces will be described further with reference to the later Figures.

In order to drive force sensor 101, pulsed signals such as signal 104 are applied to transmitter input 102 by a microcontroller 105. Force sensor 101 produces a signal 106 at receiver output 103 which is then sampled by measuring device 107. The components within measuring device 107 will be described further with reference to FIG. 7. Measuring device 107 produces a sampled signal 108 that is provided to microcontroller 105 which then stores a value representing the level of sampled signal 108 in a data storage device 109. By sampling, storing and retrieving successive values from data storage device 109, it is possible therefore to analyse how forces applied to the sensor have changed during a time window.

FIG. 2

Figure 2C:
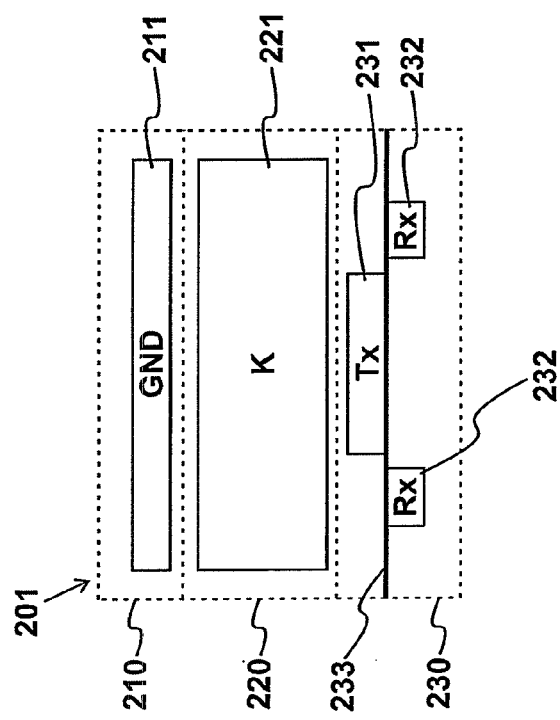
FIG. 2 shows a force sensor 201 suitable for use in the sensor system described in FIG. 1.
Figure 2B:
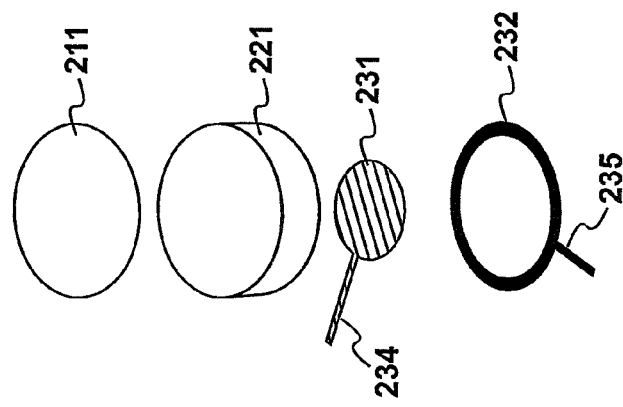
Figure 2A:
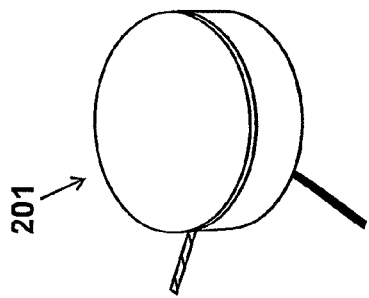

A force sensor 201 suitable for use in the sensor system described above with reference to FIG. 1 is shown in FIGS. 2A, 2B and 2C.

In FIG. 2A, a cross-section of the make up of force sensor 201 is shown. Force sensor 201 has first an electrically grounded layer 210 having an electrically grounded element 211, which, in this embodiment, comprises of a flexible conductive material such as a conductive rubber. It is to be appreciated that reference to electrical "ground" and an element being electrically "grounded" in this description encompass both the case of being physically connected to Earth or to a current carrying body capable of providing a zero-voltage reference level. Thus, the term "ground" refers generally to a body that can be approximated as capable of providing an infinite source of and sink for charge, and can thus absorb an unlimited amount of current without a change in potential.

A compressible layer 220 is positioned below electrically grounded layer, and comprises of a compressible dielectric material 221 such as foam, and thus has a spring constant k.

Further, an electrically active layer 230 is positioned below compressible layer 220, and includes a transmitter electrode 231 configured to capacitively couple to a receiver electrode 232. Transmitter electrode 231 and receiver electrode 232 comprise of conductive ink printed onto either side of a single membrane 233. Alternatively, the electrodes can be printed onto the same side of a single membrane, with appropriate modification of the printing patterns to avoid short circuits. Another arrangement involves using a larger membrane and printing the electrodes on the same side, with the membrane being folded in such a way that the receiver and transmitter electrodes are aligned. In a further alternative arrangement, electrically active layer 230 may comprise of two membranes, with transmitter electrode 231 being printed onto one membrane and receiver electrode 232 being printed onto the other.

On application of a voltage, an electric field forms around transmitter electrode 231 which causes capacitive coupling to other conductors in close proximity. This process will be described further with reference to FIG. 3.

FIG. 2B shows an exploded perspective view of the layers that make up force sensor 201. In this embodiment, transmitter electrode 231 is substantially circular with a transmitter input 234 present to allow the application of a voltage. It is possible, however, for transmitter electrode 231 to be any other suitable shape, such as a square. Receiver electrode 232 is arranged to surround transmitter electrode 231, and so in this embodiment is ring-shaped. It is to be appreciated, however, that if transmitter electrode 231 were of another shape, the shape of receiver electrode 232 would change in a complementary fashion. Receiver electrode 232 also includes a receiver output 235 to allow signals produced by receiver electrode 232 to be sampled.

FIG. 2C shows the layers of force sensor 201 having been assembled into a single unit.

Whilst the embodiment shown in the Figure describes a force sensor with the transmitter electrode surrounded by the receiver electrode, in an alternative arrangement the receiver electrode is configured to be surrounded by the transmitter electrode.

FIG. 3

Figure 3:
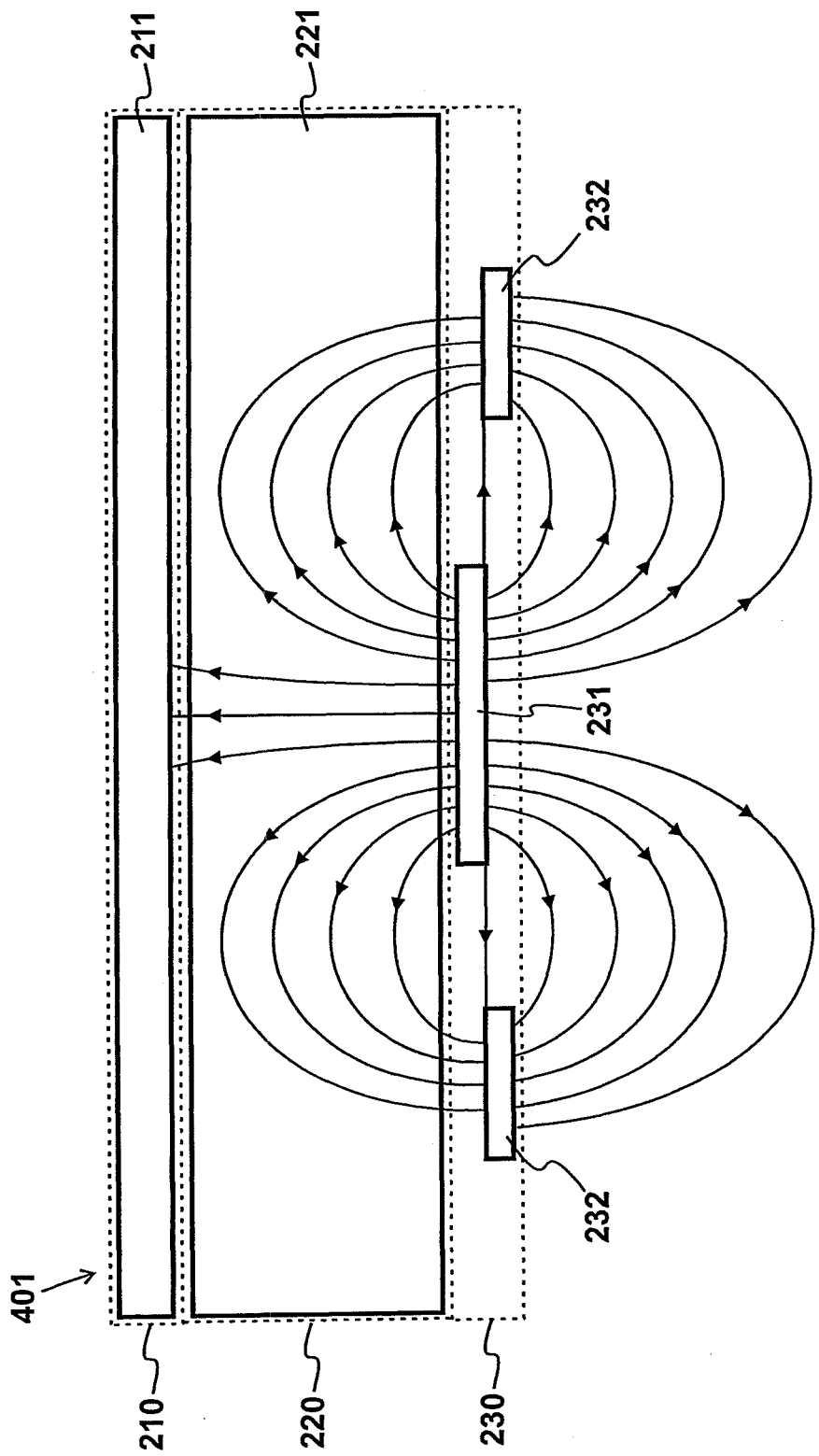
FIG. 3 shows the electric field formed within force sensor 201 when a voltage is applied to transmitter electrode 231.

The electric field formed within force sensor 201 when a voltage is applied to transmitter electrode 231 is shown in FIG. 3.

When electrically grounded layer 210 is positioned relatively far from electrically active layer 230 as shown in the Figure, the majority of flux lines of the electric field loop from transmitter electrode 231 to receiver electrode 232 so as to effect capacitive coupling between the pair of electrodes, with only a small proportion of electric field lines snapping from transmitter electrode 231 to the electrically grounded element 210.

Figure 4:
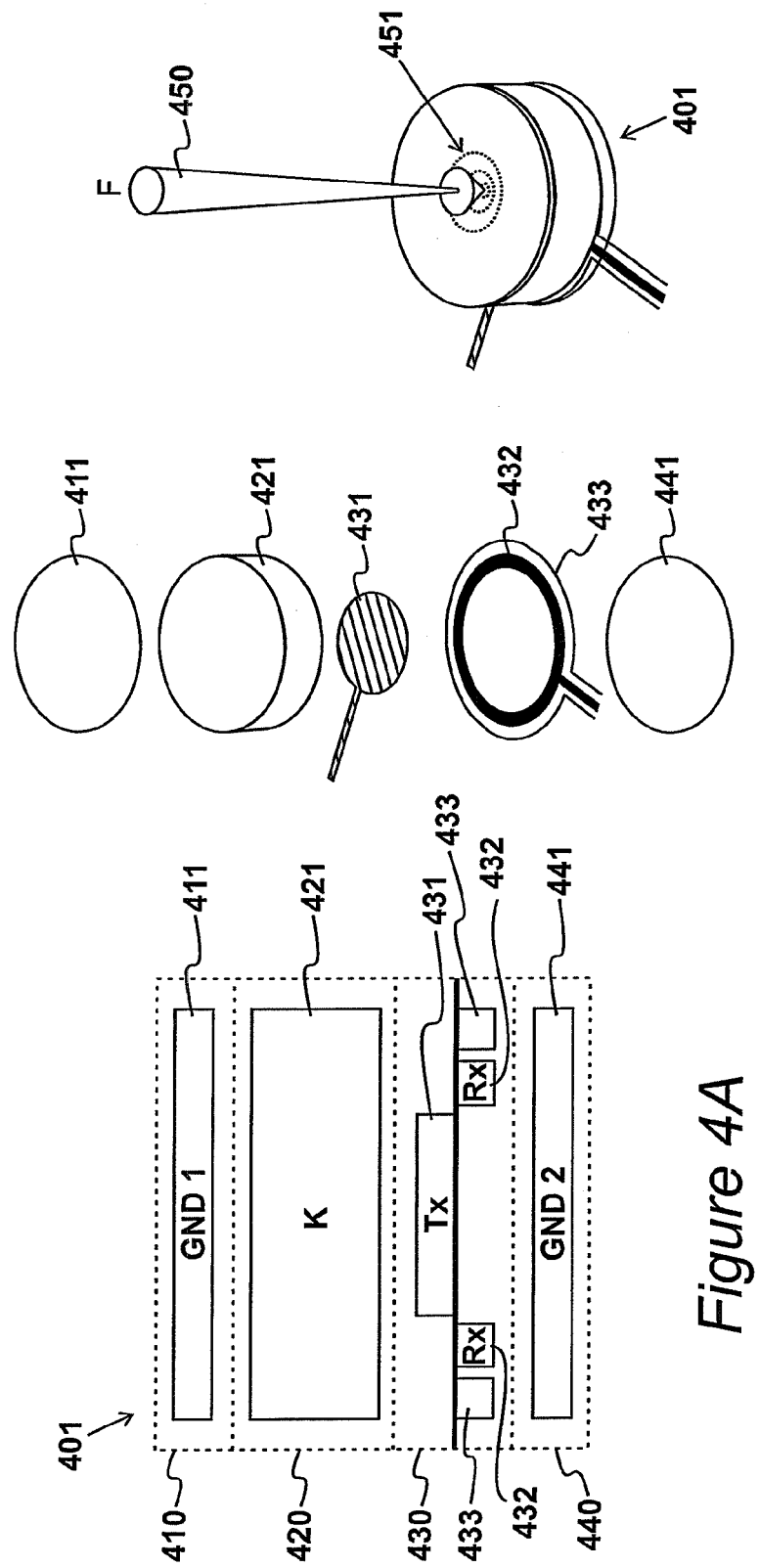
FIG. 4 shows a force sensor 401 based on the principle of construction of force sensor 201.

All of the flux lines of the electric field around transmitter electrode 231 loop to receiver electrode 232 below electrically active layer 230. Whilst the level of capacitive coupling remains constant, it does mean that stray capacitances caused by other nearby electrical networks can affect output signals from receiver electrode 232. Thus, further grounding elements can be added in order to electromagnetically shield force sensor 201 from outside electrical signals. Arrangements including said further grounding elements will be described further with reference to FIGS. 4 to 6.

FIG. 4

A force sensor 401 based on the principle of construction of force sensor 201 is shown in FIGS. 4A, 4B and 4C.

Force sensor 401 is in many respects similar to force sensor 201 described above, and as such has an electrically grounded layer 410, a compressible layer 420 and an electrically active layer 430 including a transmitter electrode 431 and a receiver electrode 432. However, in order to avoid the influence of stray capacitance that can arise in the embodiment shown in FIGS. 2 and 3, the embodiment shown in FIG. 4A comprises further grounding elements. One such further grounding element is grounding element 433 in electrically active layer 430, which stops stray capacitances in the plane of electrically active layer 430 coupling with receiver electrode 432. An additional grounding element 441 is provided in a further electrically grounded layer 440 at the bottom of force sensor 401.

FIG. 4B shows an exploded perspective view of force sensor 401. As shown, in this embodiment, transmitter electrode 431 is surrounded by receiver electrode 432. In addition, grounding element 433 is arranged to surround both receiver electrode 432 and transmitter electrode 431. Grounding element 441 is placed at the bottom of force sensor 401.

FIG. 4C shows force sensor 401 substantially constructed and experiencing the application of a force 450 of magnitude F. As shown in the Figure, force 450 has caused a depression 451. The effect of applying force 450 on the capacitance coupling between transmitter electrode 431 and receiver electrode 432 will be described further with reference to FIGS. 6 and 7.

FIG. 5

Figure 5:
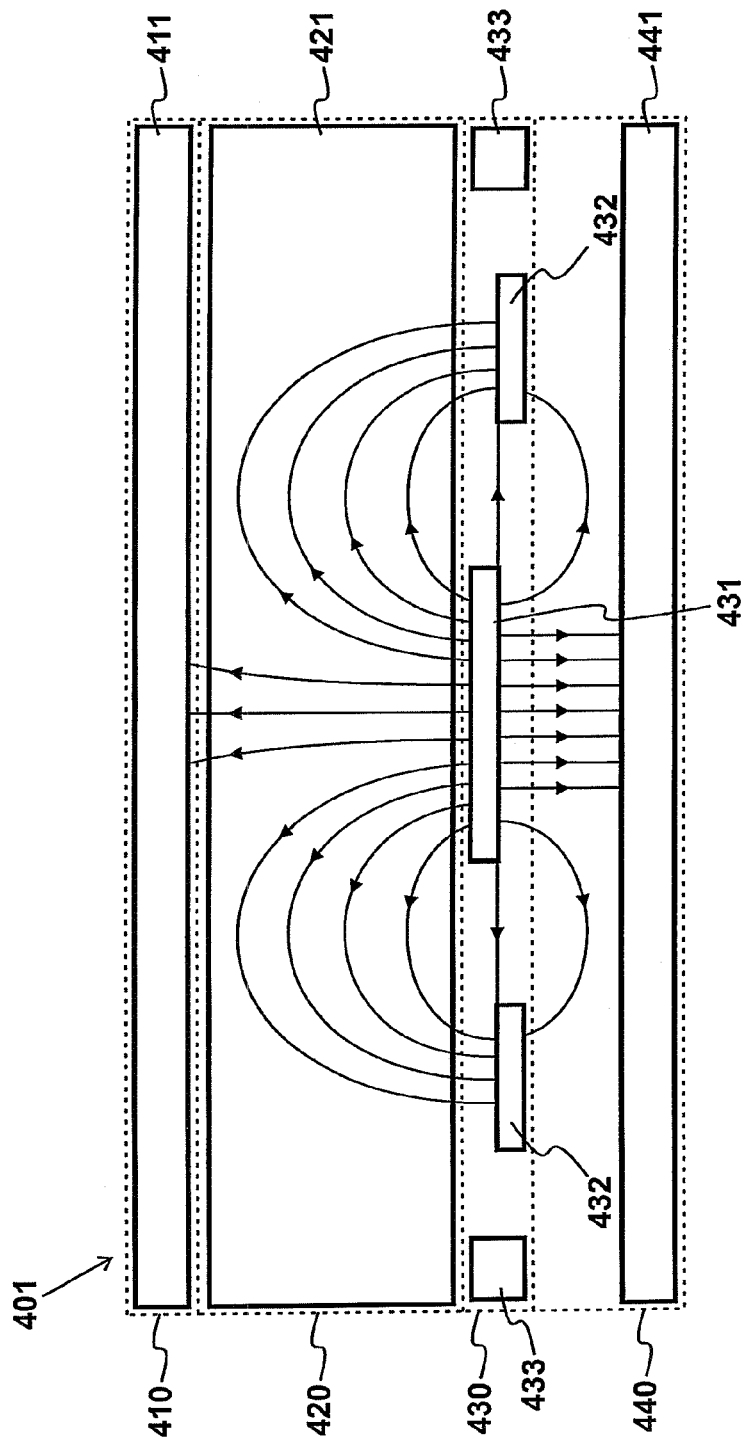
FIG. 5 shows the electric field formed within force sensor 401 when a voltage is applied to transmitter electrode 431.

The electric field formed within force sensor 401 when a voltage is applied to transmitter electrode 431 is shown in FIG. 5.

As described previously with reference to FIG. 3, the flux lines of the electric field around the top of transmitter electrode 431 will tend to loop to receiver electrode 432 and cause capacitance coupling.

As shown in the Figure, the addition of grounding element 441 at the bottom of force sensor 401 results in the majority of flux lines of the electric field around the bottom of transmitter electrode 431 connecting to ground, with only a very small proportion of the electric field coupling with the receiver electrode 431. Thus, the only substantial capacitive coupling between transmitter electrode 431 and receiver electrode 432 is through compressible layer 420.

FIG. 6

Figure 6:
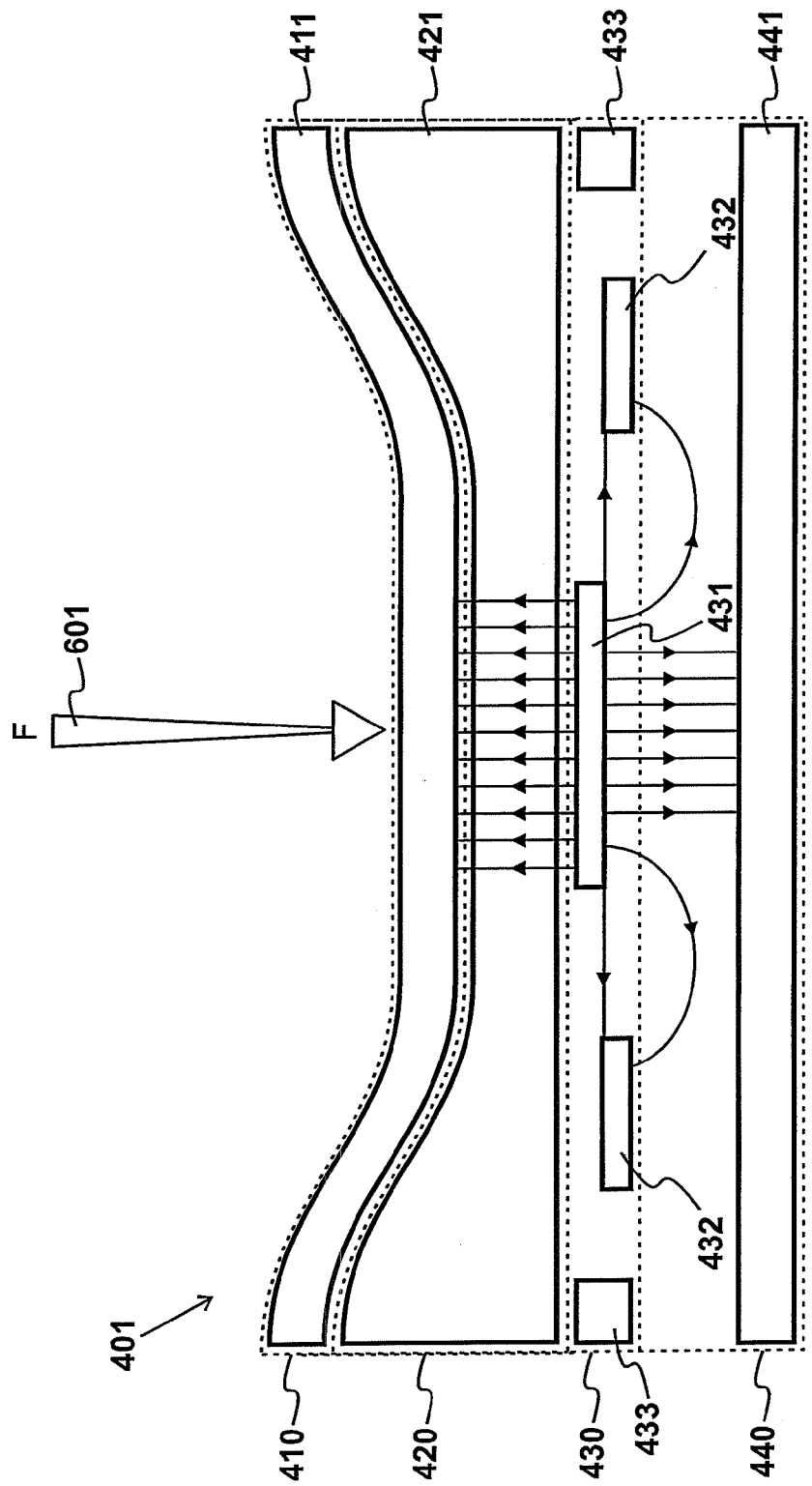
FIG. 6 shows the effect of compression of force sensor 401.

The effect of compression of force sensor 401 is shown in FIG. 6.

As shown in the Figure, when a force such as force 601 having a magnitude F is applied to force sensor, compressible material 421 in compressible layer 420 compresses and electrically grounded layer 410 thus moves closer to electrically active layer 430. The electric field's flux lines from the top of transmitter electrode 431 are thus shown in the Figure now having snapped to grounded element 411.

In the example shown in FIGS. 5 and 6, therefore, the electric field from transmitter electrode 431 has gone from causing a high level of capacitive coupling with receiver electrode 432 when no force is applied to a low level of capacitive coupling when a force is applied. The level of reduction in capacitive coupling between transmitter electrode 431 and receiver electrode 432 is dependent upon the magnitude of the applied force, which determines the degree to which the compressible layer is compressed and has thus allowed the electrically grounded layer to move.

FIG. 7

Figure 7:
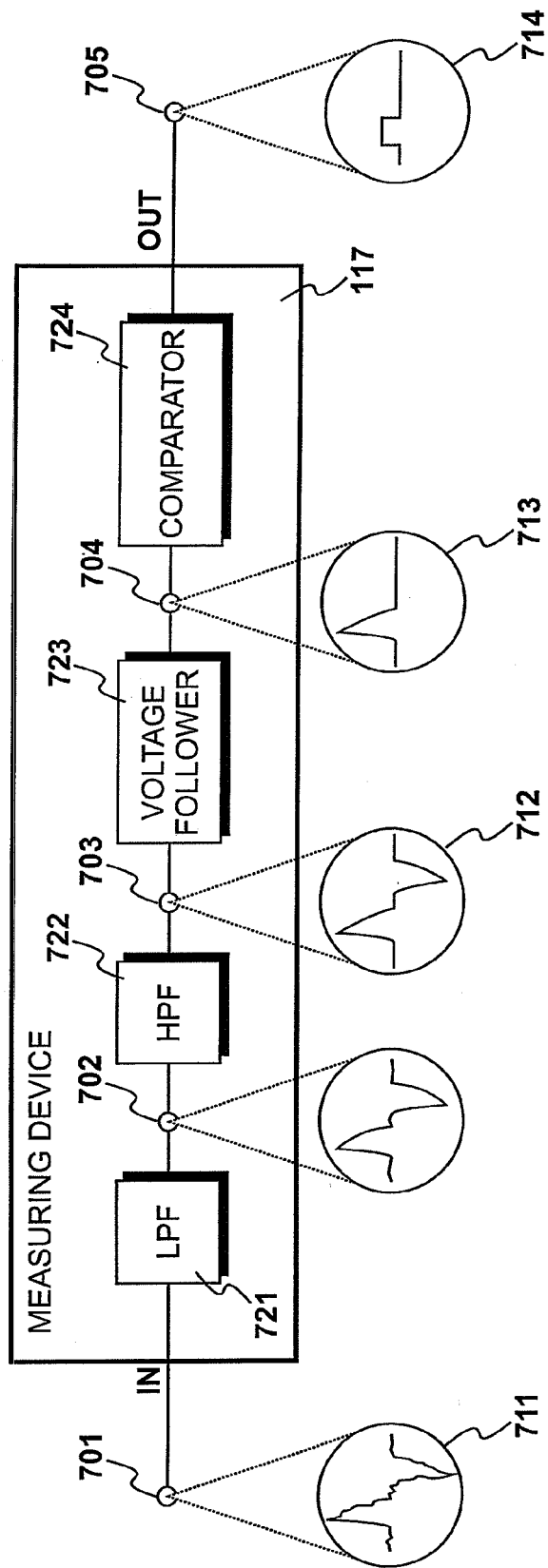
FIG. 7 shows the use of a measuring device to sample the output signal from a force sensor.

The use of a measuring device to sample the output signal from a force sensor is shown in FIG. 7.

Measuring device 117 was previously described with reference to FIG. 1, in that it was arranged to receive at an input a signal from a force sensor and to output a sample signal indicative of the magnitude of the force applied to the force sensor.

For the purposes of this example, it is assumed that the force sensor producing a signal is force sensor 401 and thus has not been affected by stray capacitance and other forms of outside electrical interference. The signal produced at receiver output of receiver electrode 432 is a voltage that peaks and decays in a positive sense when an increase in voltage is applied to transmitter electrode 431, and peaks and decays in a negative sense when a decrease in voltage is applied to transmitter electrode 432. This is due to the changes in the strength of the electric field (and therefore the capacitive coupling) between the transmitter and the receiver electrodes. These changes cause charge to flow to and from receiver electrode 432 under the influence of an induced electromotive force, which in turn results in the manifestation of a voltage on the receiver electrode.

Measuring device 117 includes an input terminal 701 at which an example signal 711 from receiver electrode 432 is shown. Signal 711 is conditioned by low pass filter 721 which filters out high frequency components of the signal to give first filtered signal 712 at an input 702 to a high pass filter 722 that filters out low frequency components. This filtering gives a second filtered signal 713 that is provided to one input 703 of a voltage follower 723, which is configured to output a signal 714 representing only the positive potion of second filtered signal 713. Voltage follower 703 has an extremely high input impedance and a very low output impedance, and thus serves to avoid crosstalk between the two sides of measuring device 117. The output from voltage follower 723 is provided to an input 704 of a comparator 724 which is configured to compare signal 714 to a threshold voltage. This comparison process produces a comparison signal 715 at output 705 whose width in the time domain is equal to the width of signal 714 that overlaps the threshold voltage. The response of receiver electrode 432 is always identical save for the amplitude of the output signal, which changes in dependence upon the level of capacitive coupling present. The duration of comparison signal 715 is therefore proportional to the level of the voltage developed at the receiver electrode and in turn the amount of force applied to the sensor.

FIG. 8

Figure 8:
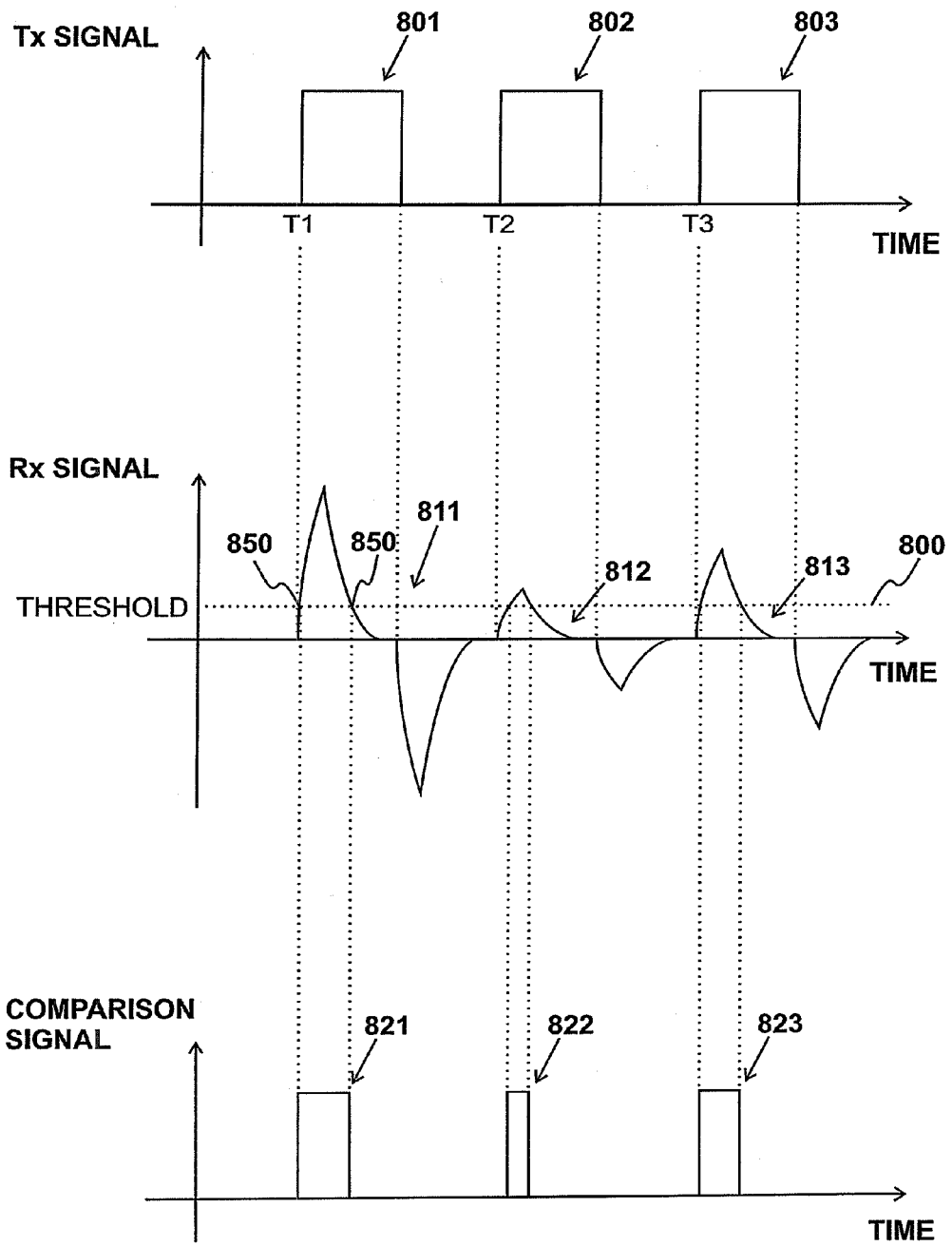
FIG. 8 shows the use of pulsed signals to allow repetitive sampling.

The use of pulsed signals to allow repetitive sampling is shown in FIG. 8.

The signals applied to transmitter electrode 431 at $T_1$, $T_2$ and $T_3$ are shown in the Figure, along with the received signals produced at receiver electrode 432 and the comparison signals produced by the measuring device 117.

At time $T_1$, a first square pulse 801 is produced by microcontroller 105 and applied to transmitter electrode 431. In this example, no force has been applied to force sensor 401 and thus the level of capacitive coupling between the receiver and transmitter electrodes in the force sensor is high and the signal 811 produced at receiver electrode 432 is shown accordingly.

A threshold used by comparator 704 is shown at 800. When the amplitude of the signal 811 from receiver electrode 432 rises above the threshold 800, as shown at crossing point 850, comparator 704 outputs a comparison signal 821. When the amplitude of the signal 811 from receiver electrode 432 drops below the threshold 800, as shown at crossing point 851, comparator 704 ceases to output comparison signal 821. Thus, the duration of comparison signal 821 is in proportion to the amount of the signal 811 that rises above the threshold.

At time $T_2$, a second square pulse 802 is applied to transmitter electrode 431. At this time, a force having a high magnitude is applied to force sensor 401 and thus causes a large degree of compression of compressible layer 420, and therefore a correspondingly large level of reduction in the capacitive coupling between the transmitter and receiver electrodes. The signal 812 produced at the receiver electrode is therefore correspondingly low, and the comparison signal 822 is proportionally shorter in duration.

At time $T_3$, a third square pulse 803 is applied to transmitter electrode 431. At this time, a force having a low magnitude is applied to force sensor 401 and thus causes a small degree of compression of compressible layer 420, and therefore a correspondingly small level of reduction in the capacitive coupling between the transmitter and receiver electrodes. The signal 813 produced at the receiver electrode is therefore correspondingly reduced compared to signal 811, and the comparison signal 822 is proportionally shorter in duration.

By supplying the comparison signals to microcontroller 105, the durations can be measured using an internal clock to a high degree of accuracy, and so values of the measured durations can be then stored in data storage device 109 for retrieval by a computing device, for example.

In an alternative embodiment, the signals produced by receiver electrode 432 can be sampled by an analog-to-digital converter connected to microcontroller 105. Such an analog-to-digital converter would have a high resolution, say 24-bit, and a high sample rate, say 192 kHz. In this arrangement, microcontroller 105 would record a string of bits in data storage device representing the digital sample for later retrieval and analysis.

FIG. 9

Figure 9C:
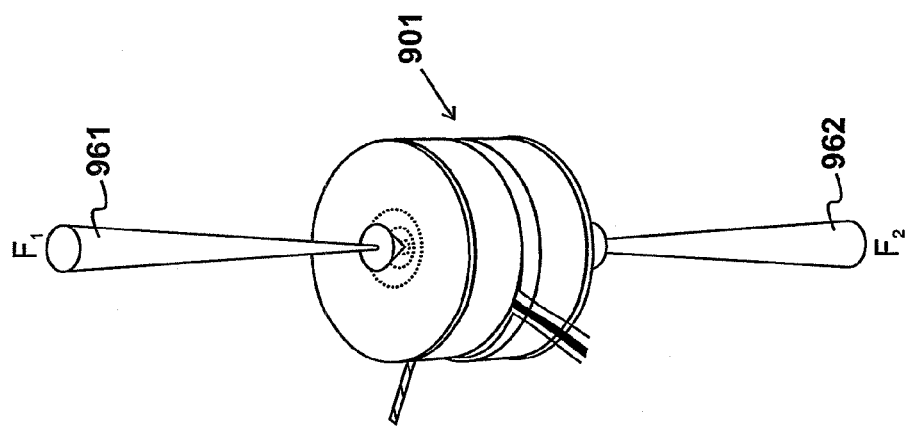
FIG. 9 shows a force sensor 901 having two compressible layers.
Figure 9B:
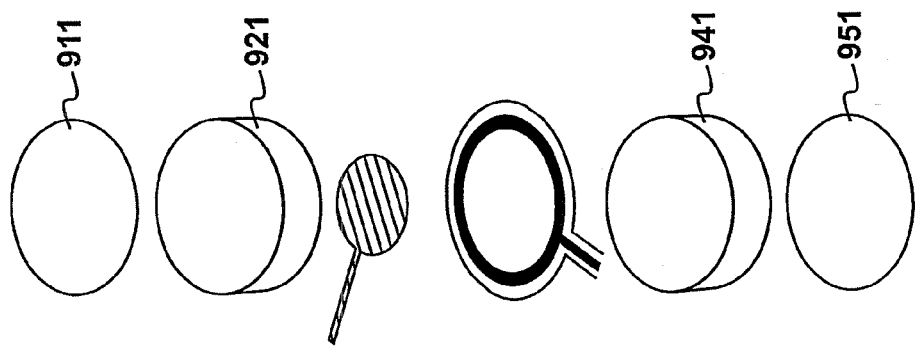
Figure 9A:
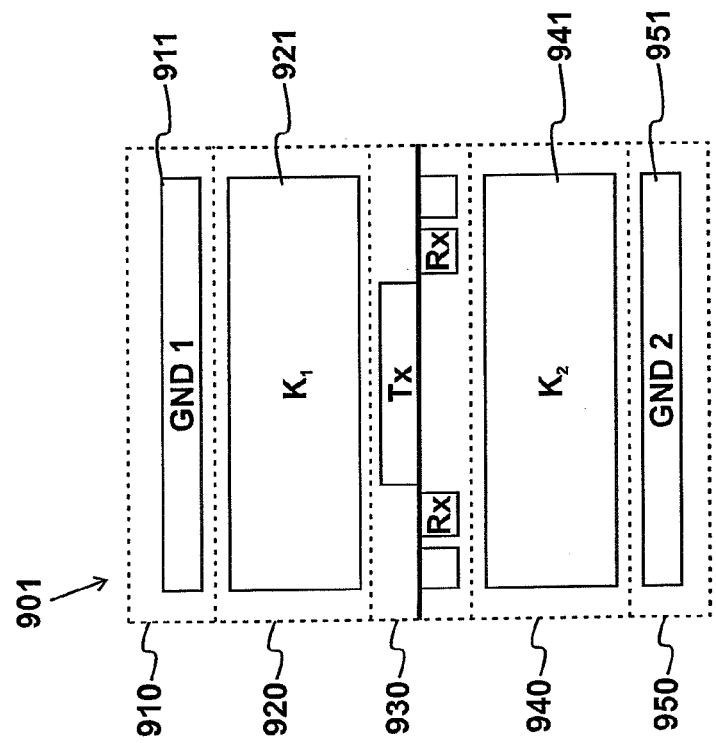

A force sensor 901 having two compressible layers is shown in FIGS. 9A, 9B and 9C.

As shown in FIG. 9A, force sensor 901 is constructed in a substantially similar way to force sensor 401, save for the fact that it comprises two compressible layers: a first compressible layer 920 and a second compressible layer 940. Compressible layer 920 comprising a first compressible material 921 is positioned between electrically grounded layer 910 having a grounded element 911 and electrically active layer 930, whilst compressible layer 940 comprising a second compressible material 941 is positioned between electrically active layer 930 and electrically grounded layer 950 having a grounded element 951. An exploded perspective view of the arrangement of layers is shown in FIG. 9B.

The two compressible layer is in force sensor 901 both comprise of compressible materials. This allows forces (force 961 of magnitude $F_1$ and 962 of magnitude $F_2$ in the Figure) to be applied to both the top and the bottom of force sensor 901 and measured when part of a suitably arranged sensor system. In an embodiment, the spring constants $k_1$ of compressible layer 920 and spring constant $k_2$ of compressible layer 940 are identical. In alternative embodiments, the two compressible materials' are arranged so that their spring constants differ, and thus a greater degree of force must be applied to one side of the sensor that the other to achieve the same amount of compression.

FIG. 10

Whilst the type of force sensor described previously with reference to FIGS. 1 to 9 is capable of sensing the magnitude of an applied force, it is not capable of sensing the direction of an applied force as well. A sensor system including a force sensor capable of sensing the magnitude and direction of an applied force is therefore shown in FIG. 10.

Figure 10:
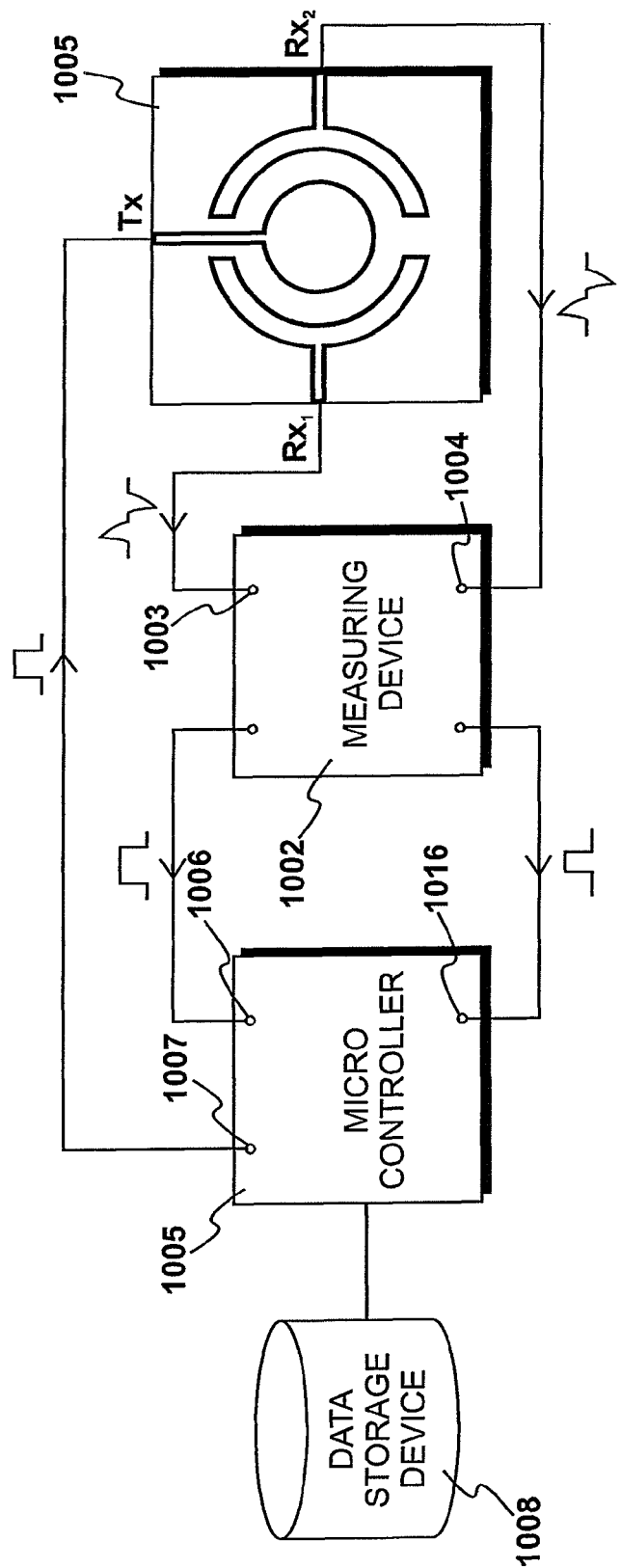
FIG. 10 shows a sensor system including a force sensor capable of sensing the magnitude and direction of an applied force.

As similarly described previously with respect to FIG. 1, the sensor system of FIG. 10 comprises a force sensor 1001 having additional receiver electrodes and a measuring device 1002 configured to receive a plurality of signals from the receiver electrodes via input 1003 and 1004. The sensor system also includes a microcontroller 1005 configured to receive comparison signals from measuring device 1002 via inputs 1006 and 1016 and to drive force sensor 1001 with voltage signals via output 1007, and a data storage device 1008 arranged in substantially the same way as data storage device 109.

FIG. 11

Figure 11B:
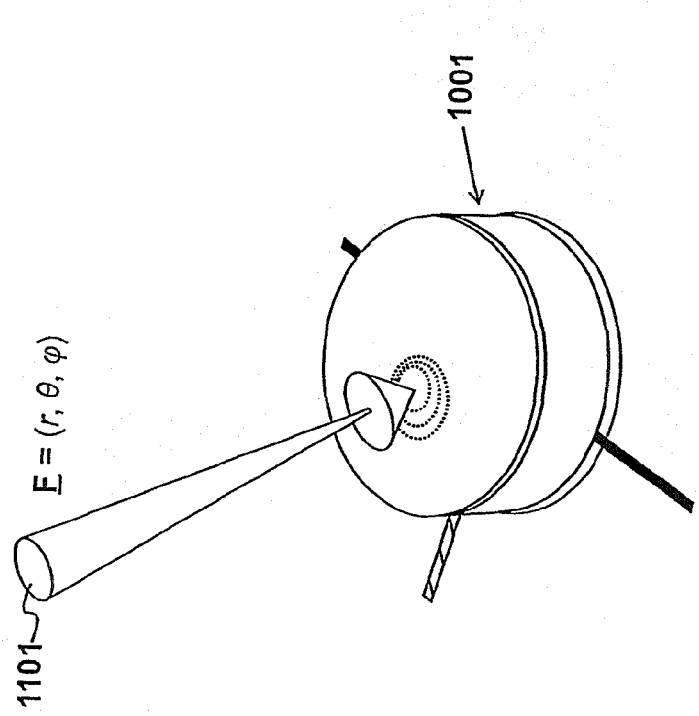
FIG. 11 shows the configuration of force sensor 1001.
Figure 11A:
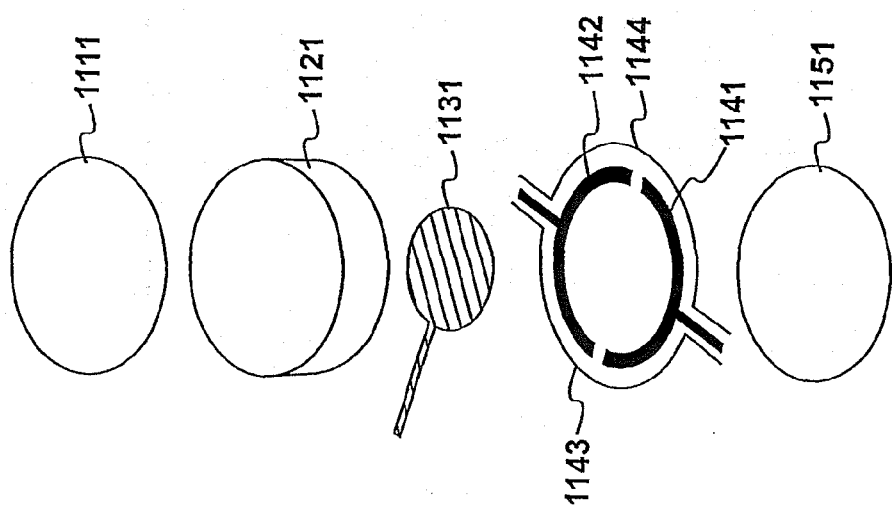

The configuration of force sensor 1001 is shown in greater detail in FIGS. 11A and 11B.

As with force sensor 401, force sensor 1001 comprises an electrically grounded layer having a grounded element 1111, a compressible layer having a compressible material 1121, an electrically active layer having a transmitter electrode 1131 and a receiver electrode 1141, and a lower grounding element 1151.

However, in this particular embodiment an additional receiver electrode 1142 is provided. Additional receiver electrode 1142 is electrically separate from receiver electrode 1141, and provides, in this example, a second output to measuring device 1002. Two grounding elements 1143 and 1144 surround the receiver electrodes to provide electromagnetic shielding from stray capacitances and the like.

As shown in FIG. 11B, when constructed, force sensor 1001 is receptive to forces, such as force 1101, applied at an angle, that is to say forces represented by a vector $\underline{F}$ with spherical co-ordinates of magnitude r, zenith angle $\theta$ and azimuth angle $\phi$. The process by which the angles of the force may be determined will be described further with reference to FIG. 12.

It is to be appreciated that only one additional receiver electrode is shown in this example, and that more receiver electrodes may be provided to give indications of angles in more dimensions and to give higher resolution measurements. It has been recognised that by providing in total four receiver electrodes it is possible to ascertain all parameters of a force $\underline{F}$ as defined above.

FIG. 12

Figure 12:
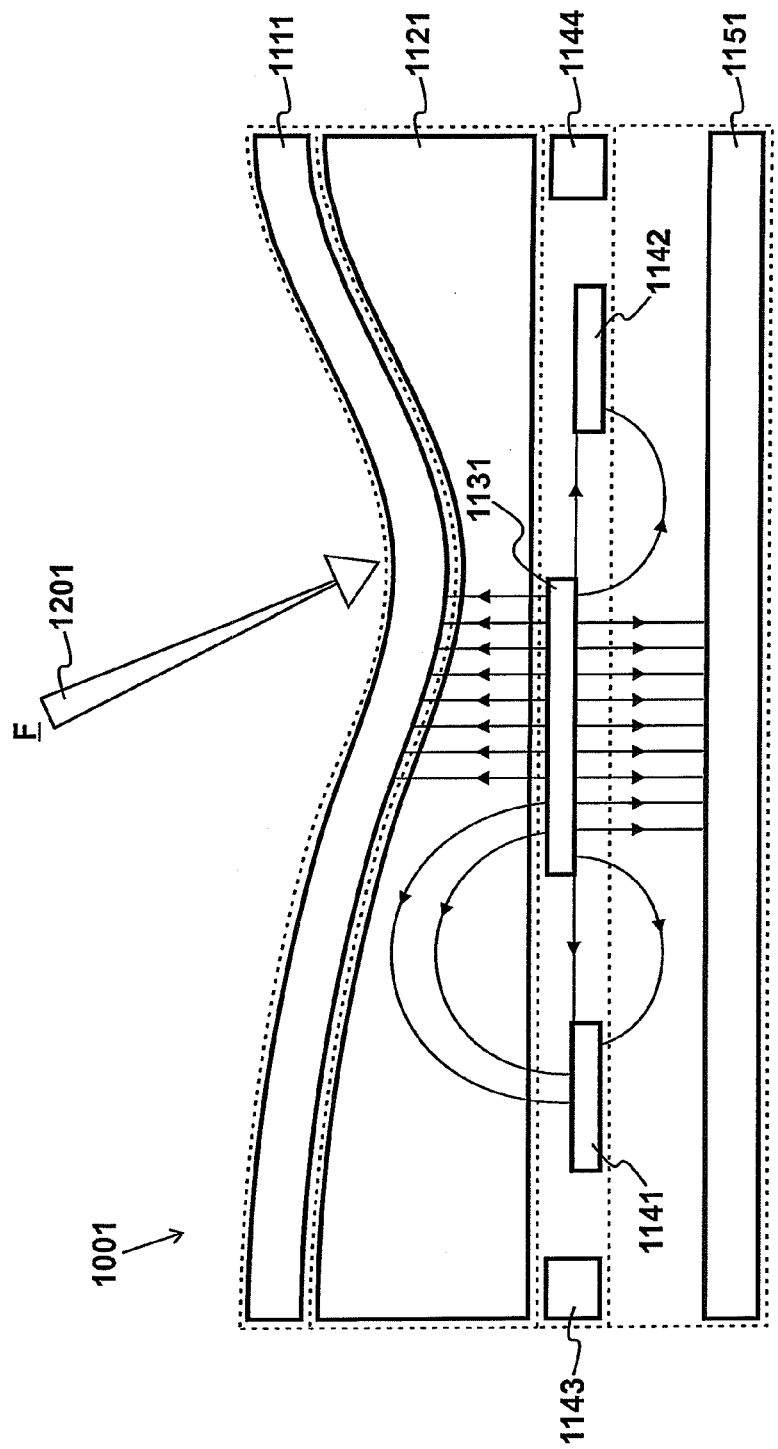
FIG. 12 shows the compression of force sensor 1001 when a force at an angle is applied.

The compression of force sensor 1001 when a force at an angle is applied is shown in FIG. 12.

When force 1201 is applied, the compression of compressible material 1121 is not uniform, and so grounded element 1111 moves closer to transmitter electrode 1131 in some places more than others. Thus, in the example shown in the Figure, the electric field's flux lines show the capacitance coupling between transmitter electrode 1131 and receiver electrode 1142 is reduced to a greater degree than the capacitance coupling with receiver electrode 1141.

FIG. 13

Figure 13:
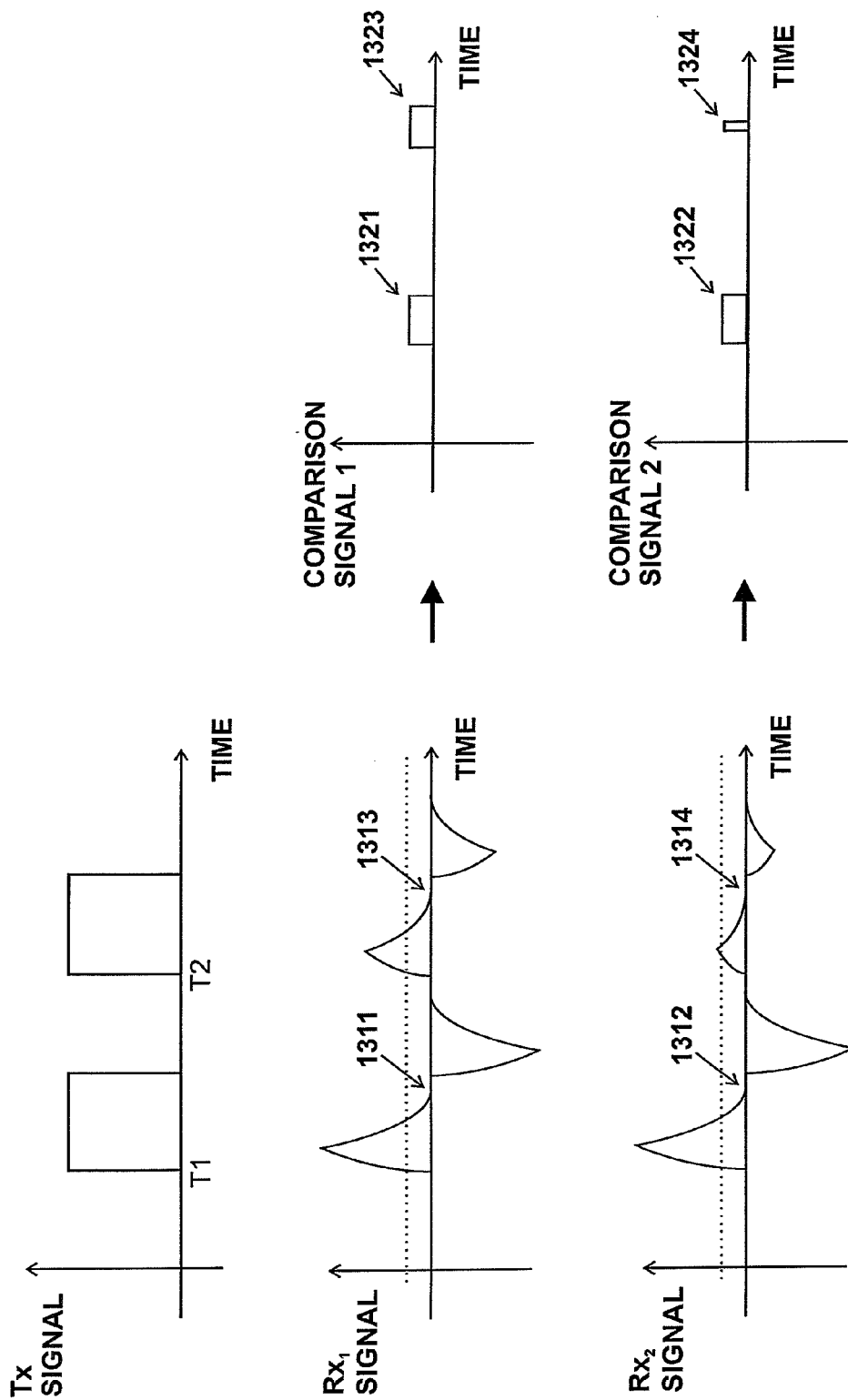
FIG. 13 shows an example of voltage signals at each of the receiver electrodes.

An example of voltage signals at each of the receiver electrodes is shown in detail in FIG. 13.

At time $T_1$, a first square pulse 1301 is applied to transmitter electrode 1111, and the signals 1311 and 1312 produced by each receiver electrode is identical—indicating that no force is present. The comparison signals 1321 and 1322 produced by measuring device 1002 are therefore also identical. At time $T_2$, however, a force such as force 1201 is applied and thus in response to a second square pulse 1302, the signal 1313 produced by receiver electrode 1114 (shown in the Figure as $Rx_1$) is reduced to a lesser degree than the signal 1314 produced by receiver electrode 1116 (shown in the Figure as $Rx_2$). The duration of the corresponding comparison signals 1323 and 1324 are therefore also reduced accordingly. It is therefore possible to infer the angle of force 1201 in one dimension in this example.

As will be appreciated by those skilled in the art, four different signals would be produced and sampled by the measuring device in the case where four separate receiver electrodes are provided, and all parameters relating to the magnitude and direction of the force 1201 can be inferred.

FIG. 14

Figure 14:
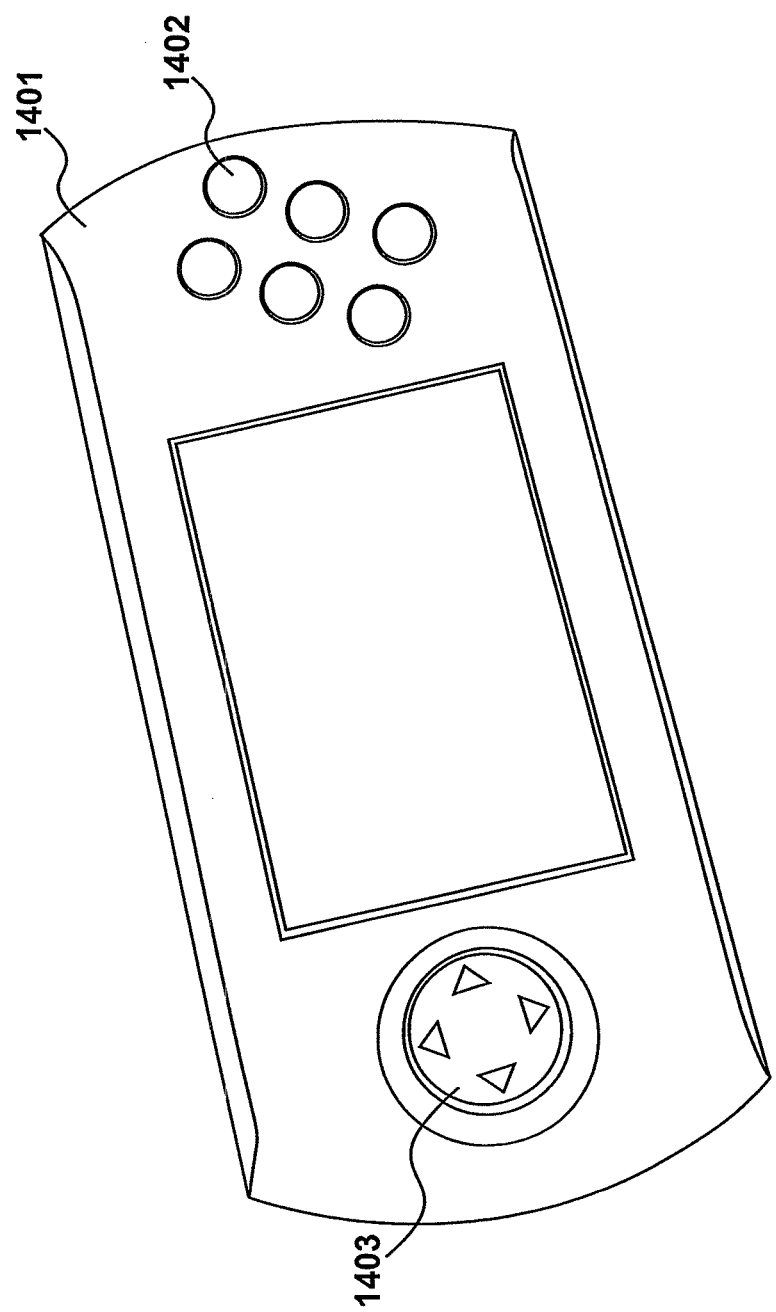
FIG. 14 shows a handheld games console 1401 using force sensors such as force sensor 401 and force sensor 1001.

A handheld games console 1401 using force sensors such as force sensor 401 and force sensor 1001 is shown in FIG. 14.

Force sensors for providing an indication of the magnitude of an applied force, such as force sensor 401, are used under buttons such as button 1402 in the handheld games console 1401. This allows 'analog' control of games running on handheld games console 1401. Force sensors for providing an indication of the magnitude and direction of an applied force, such as force sensor 1001, are used in the direction control 1403 to allow 'analog' control of direction in games running on handheld games console 1401.

FIG. 15

Figure 15:
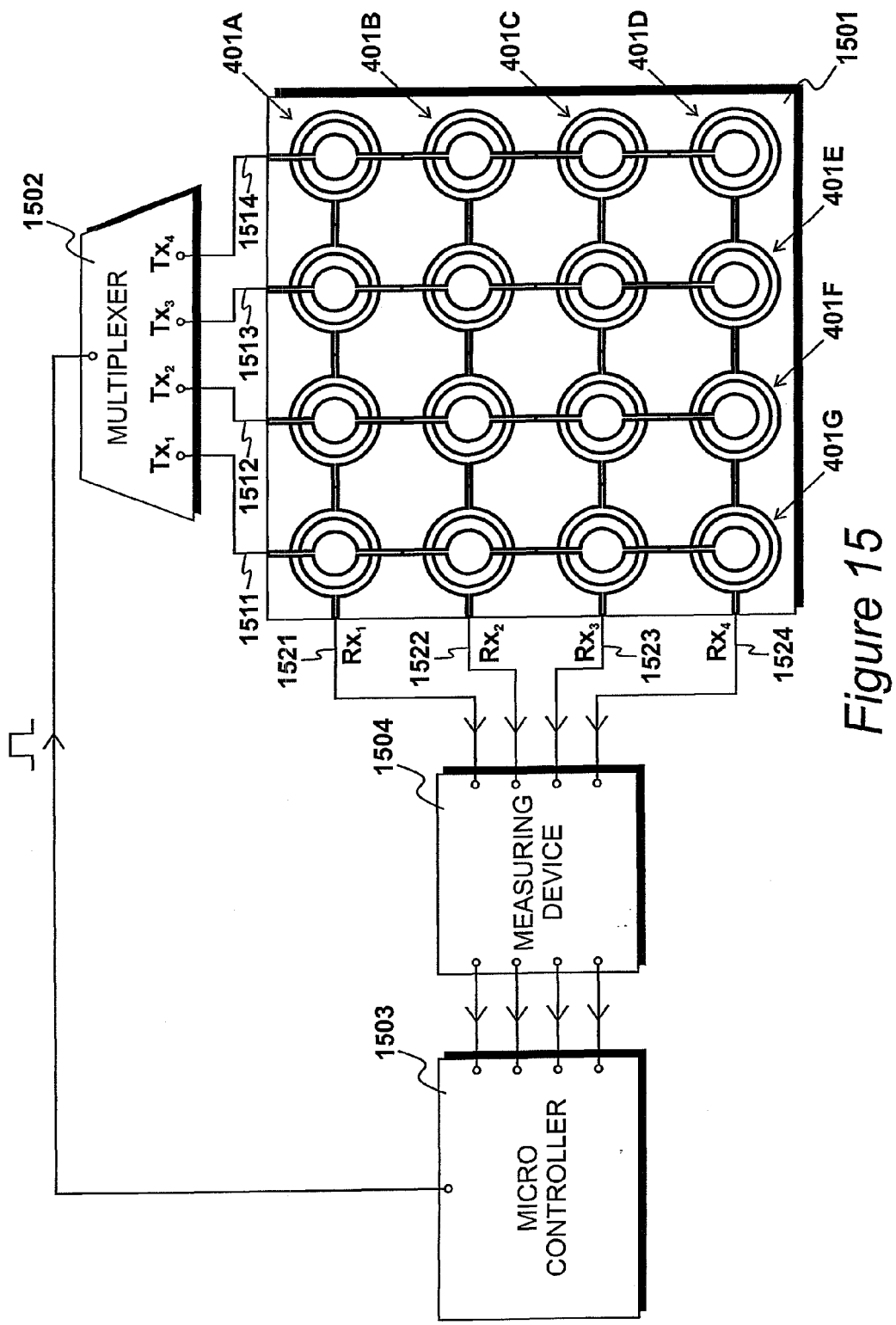
FIG. 15 shows a sensor array 1501 comprising a plurality of force sensors.

A sensor array 1501 comprising a plurality of force sensors is shown in FIG. 15.

In this particular example, sensor array 1501 comprises a plurality of force sensors arranged in a square matrix. Electrical connections are provided between the force sensors so that transmitter electrodes are electrically connected in series in discrete columns, representing transmission channels. This can be seen in the Figure, with the transmitter electrodes of force sensors 401A, 401B, 401C and 401D electrically connected and thus forming one transmission channel 1514. Receiver electrodes are electrically connected in series in discrete rows, representing reception channels. Again, referring to the Figure, this can be seen with the receiver electrodes of force sensors 401D, 401E, 401F and 401G connected and forming a single reception channel 1524.

In alternative examples, sensor array 1501 could comprise a plurality of force sensors such as force sensor 1001 with an appropriate increase in electrical connectivity. Additionally, sensor array 1501 could be arranged to have a plurality of sensors in a single row, thus having a single transmission channel and a plurality of reception channels or vice versa. It is also envisaged that the force sensors could be placed in a circular arrangement, with appropriate provision of electrical connections to provide discrete transmission and reception channels.

In the example shown in the Figure, each transmission channel 1511, 1512, 1513 and 1514 is connected to respective outputs of a multiplexer 1502. Multiplexer 1502 is connected to the output of a microcontroller 1503. Microcontroller 1503 is configured to provide a repeated sequence of voltage signals that are then routed onto each transmission channel 1511 to 1514 in turn by multiplexer 1502.

In an embodiment, multiplexer 1502 is configured to multiplex voltage signals to a first set of transmission channels when no force is applied, say, every other channel. In the context of the Figure, therefore, multiplexer 1502 multiplexes the voltage signals to only transmission channels 1511 and 1513 when no force is detected. When a force is detected as being applied to sensor array 1501, say at force sensor 401B, multiplexer 1502 is configured to apply the voltage signals to a second set of transmission channels corresponding to the identified location of the force applied to the sensor array, which in this example would be transmission channels 1513 and 1514.

This switching between a first set and a second set allows a high temporal resolution to be maintained across the sensor array. For a sensor array is a 64 by 64 matrix, and thus has 64 transmission channels, multiplexing on every eighth transmission channel when no force is applied allows the sensor array to have an eight-times higher temporal resolution than if the voltage signals were multiplexed onto all 64 transmission channels. When a force is applied, then the voltage signals will be multiplexed onto a set of transmission channels corresponding to the identified location of the force applied to the sensor array in order to increase the spatial resolution of detection whilst maintaining a high temporal resolution.

Reception channels 1521, 1522, 1523 and 1524 are connected to a measuring device 1504 arranged in much the same way as measuring device 117. In this example, however, measuring device 1504 comprises four channels arranged to sample signals from each reception channel individually. This prevents overlap between signals developed at receiver electrodes positioned on the same transmission channel.

When microcontroller 1503 receives comparison signals from measuring device 1504, it stores both data pertaining to the force applied to an individual sensor and data describing which sensor in the sensor array that the comparison signal corresponds to.

FIG. 16

Figure 16:
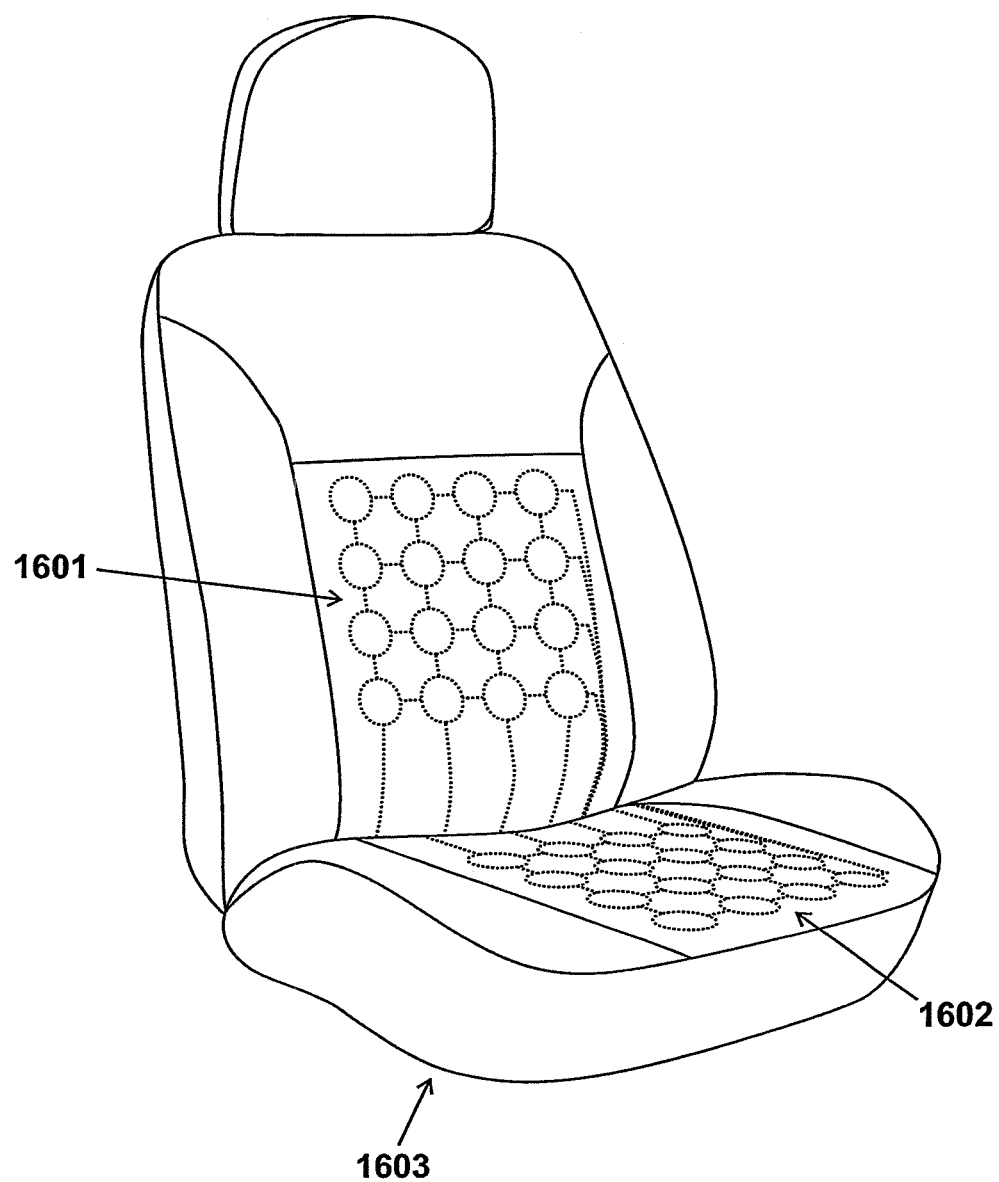
FIG. 16 shows a motor vehicle seat employing sensor arrays such as sensor array 1501.

A motor vehicle seat employing sensor arrays as shown in FIG. 15 is shown in FIG. 16.

Sensor arrays 1601 and 1602 substantially similar to sensor array 1501 are placed under the outer layer of upholstery of car seat 1603. This allows the software controlling various aspects of a motor vehicle's operation to ascertain the nature of a body occupying a seat. For example, the pattern produced by data collected by each sensor array will differ depending on whether a child or an adult is occupying the seat, or indeed if a child car seat has been placed in the seat. The motor vehicle can then make an appropriate decision on the degree of inflation (if at all) of an airbag in the event of an accident, for example.

The invention claimed is:

1. A force sensor configured to sense the magnitude and direction of a force in at least one direction, the sensor having a compressible layer, an electrically grounded layer and an electrically active layer, wherein:
   said electrically grounded layer comprises of a flexible conductive material;
   said electrically active layer comprises a transmitter electrode and a plurality of receiver
electrodes arranged to surround said transmitter electrode, in which said transmitter electrode is configured to capacitively couple to each one of said plurality of receiver electrodes; and
   said compressible layer is positioned between said electrically grounded layer and said electrically active layer;
   wherein the level of capacitive coupling between said transmitter electrode and each one of said plurality of receiver electrodes varies in dependence upon the magnitude and the direction of a force applied to the sensor which moves said electrically grounded layer closer to said electrically active layer by compression of said compressible layer.

2. The force sensor of claim 1, wherein the capacitance coupling between said transmitter electrode and said plurality of receiver electrodes is induced by applying a voltage to said transmitter electrode.

3. The force sensor of claim 2, wherein said voltage is applied by driving said transmitter electrode with a pulsed signal having a predetermined rate of repetition.

4. The force sensor of claim 1, wherein each one of said plurality of receiver electrodes produces an electrical signal that is proportional to the level of its capacitance coupling with said transmitter electrode.

5. The force sensor of claim 4, further comprising:
   a measuring device which comprises a comparator configured to produce a comparison signal whose width in the time domain is proportional to the level of the voltage developed at each one of said plurality of receiver electrodes, such that said measuring device is arranged to sample the signal produced by each one of said plurality of receiver electrodes; and
   a microcontroller configured to measure the duration of said comparison signal and store a value representing said duration in a data storage device.

6. The force sensor of claim 1, wherein said electrically active layer further comprises a grounded element arranged to electromagnetically shield said transmitter electrode and said plurality of receiver electrodes.

7. The force sensor of claim 1, wherein said compressible layer comprises a compressible dielectric material.

8. The force sensor of claim 1, wherein said electrically active layer comprises a membrane on to which said transmitter electrode is printed.

9. A sensor array, comprising a plurality of force sensors according to claim 1.

10. The sensor array of claim 9, wherein said plurality of force sensors is arranged so that:
    a plurality of electrical connections between transmitter electrodes define a transmission channel, and
    a plurality of electrical connections between receiver electrodes define a reception channel.

11. The sensor array of claim 10, wherein a plurality of transmission channels are connected to a multiplexer configured to apply a voltage to each of said transmission channels in a predefined sequence.

12. The sensor array of claim 11, wherein said multiplexer applies voltages to a first set of said transmission channels when there is no force applied, and applies a voltages to a second set of said transmission channels selected in accordance with an identified location of a force applied to said sensor array.

13. The sensor array of claim 10, wherein said reception channel is connected to a measuring device comprising a comparator configured to provide a comparison Signal whose width in the time domain is proportional to the level of the voltage developed across the reception channel.

14. The sensor array of claim 13, further comprising a microcontroller connected to said measuring device, which microcontroller measures the duration of said comparison signal and stores said duration in a data storage device along with data identifying which force sensor the comparison signal corresponds to.

15. A method of sensing the magnitude and direction of a force in at least one direction, comprising the steps of:
    providing a force sensor having a compressible layer, an electrically grounded layer and an electrically active layer, in which said electrically grounded layer comprises of a flexible conductive material, and in which said electrically active layer comprises a transmitter electrode and a plurality of receiver electrodes arranged to surround said transmitter electrode, in which said transmitter electrode is configured to capacitively couple to each one of said plurality of receiver electrodes, and where said compressible layer is positioned between said electrically grounded layer and said electrically active layer;

applying a force to said force sensor to compress said compressible layer, thus moving said electrically grounded layer closer to said electrically active layer; and detecting the degree to which the level of capacitance coupling between said transmitter electrode and each one of said plurality of receiver electrodes varies, wherein the level of capacitance coupling varies in dependence upon the magnitude and the direction of the force applied.

16. The method of claim 15, further comprising the step of applying a voltage to said transmitter electrode to induce a proportional level of capacitance coupling with each one of said plurality of receiver electrodes.

17. The method of claim 16, wherein each one of said plurality of receiver electrodes produces an electrical signal that is proportional to its level of capacitance coupling with said transmitter electrode.

18. The method of claim 17, wherein:

the step of detecting the reduction in capacitance coupling comprises sampling the signal produced by each one of said plurality of receiver electrodes using a measuring device comprising a comparator configured to produce a comparison signal whose width in the time domain is proportional to the level of the voltage developed at the respective one of said plurality of receiver electrodes; and the duration of said comparison signal is measured by a microcontroller which stores a value representing said duration in a data storage device.

* * * * *